United States Patent [19]
Kolesinski et al.

[11] Patent Number: 4,548,981
[45] Date of Patent: Oct. 22, 1985

[54] COMPOSITIONS AND ARTICLES CONTAINING POLYMERIC VINYL AROMATIC AMINIMIDES

[75] Inventors: Henry S. Kolesinski, Burlington; Lloyd D. Taylor, Lexington, both of Mass.

[73] Assignee: Polaroid Corporation, Cambridge, Mass.

[21] Appl. No.: 510,274

[22] Filed: Jul. 1, 1983

[51] Int. Cl.[4] ............................................. C08L 57/12
[52] U.S. Cl. ................................ 524/555; 428/473.5; 524/815; 526/305
[58] Field of Search ................ 526/305; 524/555, 815

[56] References Cited
U.S. PATENT DOCUMENTS
3,641,145 2/1972 Culbertson .......................... 526/305

OTHER PUBLICATIONS
Journal of Polymer Science, Part A-1, vol. 6, pp. 2197-2207, 1968.

Primary Examiner—Paul R. Michl
Attorney, Agent, or Firm—Louis G. Xiarhos

[57] ABSTRACT

Compositions and articles containing polymeric vinyl aromatic aminimides are disclosed. The polymeric vinyl aromatic aminimides exhibit unusual rheological properties in an aqueous medium. The polymers provide thermoreversible gelling properties and exhibit negative thixotropy.

11 Claims, No Drawings

COMPOSITIONS AND ARTICLES CONTAINING POLYMERIC VINYL AROMATIC AMINIMIDES

BACKGROUND OF THE INVENTION

This invention relates to certain compositions and articles containing a polymer of a vinyl aromatic aminimide. More particularly, it relates to compositions and articles incorporating polymeric aminimides which exhibit thermoreversible gel-forming properties and negative thixotropy.

Polymeric aminimides and their production have been reported in the chemical literature and described in patents. For example, vinyl aromatic aminimides and polymers thereof are described in the publication of B. M. Culbertson et al., Journal of Polymer Science: PART A-1, Vol. 6, 2197-2207 (1968); and in U.S. Pat. No. 3,641,145 (issued Feb. 8, 1972 to B. M. Culbertson et al.). These polymers contain the aminimide moiety

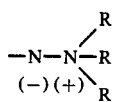

and are described in the aforementioned patent as being soluble in water. The polymers are disclosed as having utility in the formation of polyurethanes based on the ability of the polymeric aminimides to be converted to polyisocyanates.

It has been found that the polymeric vinyl aromatic aminimides, e.g., poly (trimethylamine-4-vinylbenzimide), exhibit unusual rheological properties in an aqueous medium such that the polymers can be employed to advantage where such properties are desireably utilized. For example, it has been discovered that a polymer of trimethylamine-4-vinyl-benzimide at a 5% wt. concentration in water forms a thermoreversible gel. Negative thixotropy is exhibited where, for example, the polymer is present at a concentration of about 2.5% by weight.

SUMMARY OF THE INVENTION

According to the present invention, there has been discovered certain unusual rheological behavior of polymeric vinyl aromatic aminimides in aqueous media. In its composition aspect, the invention provides a composition exhibiting negative thixotropic or thermoreversible gel forming properties comprising an aqueous medium having therein, at a weight concentration of about 1% to about 20%, a polymeric vinyl aromatic aminimide comprising repeating units of the formula

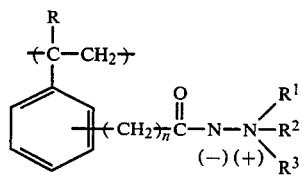

Formula (I)

wherein R is hydrogen, methyl or halogen; n is zero or one; and each of $R^1$, $R^2$ and $R^3$ is alkyl, aryl, aralkyl or alkaryl, or two of $R^1$, $R^2$ and $R^3$, together with the nitrogen atom, complete a heterocyclic ring. The composition, depending upon the concentration of the polymeric vinyl aromatic aminimide provides a thermoreversible gel composition or exhibits negative thixotropy, i.e., the composition thickens upon application of shear stress and relaxes upon removal of the shear stress.

In its article aspect, the present invention provides a support sheet carrying a layer of thermoreversible gel, the gel comprising a medium of water and having therein, at a concentration in the range of about 3% to about 20%, a polymeric vinyl aromatic aminimide as aforedescribed.

DETAILED DESCRIPTION OF THE INVENTION

The compositions of the present invention can be conveniently prepared by introducing the polymeric vinyl aromatic aminimide with stirring into the aqueous medium. Suitable polymers and a method for their preparation are described in the aforementioned U.S. Pat. No. 3,641,145. Preferably, the polymer will be purified, as by ultrafiltration or dialysis, prior to forming the compositions of the invention. In forming a thermoreversible gel, the polymer will be added to water at a concentration which is effective to provide gelation, generally in the range of about 3% to about 20%. A preferred range is from 5% to 10%. An example of a gel of the invention is the gel formed by adding poly (trimethylamine-4-vinyl-benzimide) to water at a concentration of 5% by weight. The resulting gel melts at about 35° C. The gel can be utilized as a vehicle or medium for various agents, photographic, therapeutic or the like, releasable thermally as desired from the gel. If desired, a gel composition of the invention can be applied as a layer to a suitable support sheet of glass, plastic or the like, e.g., polyethylene terephthalate, cellulose acetate, polystyrene or the like.

In the repeating units represented by Formula (I) hereinbefore, the $R^1$, $R^2$, $R^3$ groups can include alkyl (e.g., methyl), aryl (e.g., phenyl), alkaryl (e.g., benzyl) or aralkyl (e.g., tolyl). Two of such groups can complete a heterocyclic radical such as pyrrolidine or piperidine. Preferably, each of $R^1$, $R^2$ and $R^3$ will be alkyl, such as methyl, and n will be zero. R will preferably be hydrogen. A preferred polymer for preparation of the compositions and articles hereof is a polymer comprising repeating units of the formula

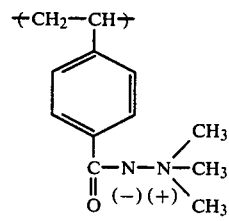

Formula (II)

The polymers utilized herein can be homopolymers or copolymers. Thus, comonomers which may be desired for purposes of modifying the properties of the gel as required for a particular purpose can be utilized for the production of copolymers including the repeating units of Formula (I) and/or (II). For example, acrylamide can be copolymerized with trimethylamine-4-vinyl benzimide to provide copolymers which form thermoreversible gels in water. For example, copolymers of trimethylamine-4-vinyl benzimide and acrylamide in weight proportions, respectively, of 9:1, 8:2 and 7:3 provide thermoreversible gels with water.

The polymeric vinyl aromatic aminimides are compatible with other polymers including latices and can form thermoreversible gels therewith. Thus, the aqueous medium for gel formation can contain other polymers adapted to vary the physical or chemical properties of the resulting gel and can comprise, for example, a polymeric latex of butylacrylate/diacetone acrylamide/styrene/methacrylic acid (60/30/4/6 parts by weight). Such a gel composition can be coated as a layer, for example, in a photographic film unit.

A gel composition of the present invention can include various agents adapted to a particular purpose, for example, developing agents, development restrainers dyes or other photographic agents. Biological agents such as antibodies, enzymes or pharmacological agents can be incorporated into the gel. If desired, the agent can be made available for its intended function by thermal reversal, i.e., melting of the gel structure. Stabilizing agents for the gel, such as minor amounts of salts which enhance the physical structure of the gel can be employed. Amounts of salts which effect an undesirable "salting out" precipitation are, however, to be avoided.

In many applications, it will be desireable to utilize the gel composition hereof as a layer on a suitable sheet material such as glass, or plastic, e.g., polyethylene terephthalate or polystyrene. Preferably, the support sheet will be a transparent sheet to facilitate measurement of color generation or disappearance, or density or other changes as may desireably be monitored using light transmission techniques in known manner. For example, a thermoreversible gel hereof can be coated as a layer on a transparent polyester support and the gel can be utilized as a medium for the conduct of medical diagnostic reactions evaluated or monitored with the aid of optical devices using a light beam or other light source.

The polymeric vinyl aromatic aminimides can also be employed to provide an aqueous medium with negative thixotropy. For example, the polymer can be added to water at a concentration of about 1% to about 3% to provide a composition exhibiting a thickening effect upon application of shear. Removal of the stress effects a viscosity reduction. A composition of the invention exhibiting negative thixotropy can be used for the coating of various polymeric or other coating compositions by methods utilizing a pressurized coating head, such as a coating valve, slot or orifice operating under pressure. Application of the coating composition is facilitated by thickening which occurs as the composition is passed through the coating head and which counter balances the tendency of other components of the coating composition to shear thin.

The present invention is illustrated in the following examples which are intended to be illustrative only and not limitative.

EXAMPLE 1

Into a reaction vessel containing 270 mls. of water were dissolved 30 grams of trimethylamine -4-vinyl-benzimide. The reaction vessel containing the resulting solution was flushed with nitrogen and 0.03 gram of ammonium persulfate was added. The vessel was flushed with nitrogen, stoppered and heated for 20 hours at 65° C. The resulting polymer was precipitated by addition to a non-solvent (acetone) and the resulting polymer was triturated in acetone and ground in a Waring blender. The polymer product was filtered and dried in vacuo. The product, poly (trimethylamine -4-vinyl-benzimide) was obtained in 24 gram yield.

EXAMPLE 2

The polymer obtained from EXAMPLE 1 was added with stirring to water at levels of 2.5%, 5% and 10% by weight of each composition. The physical properties of each composition were noted. Extremely weak gel formation at 0° C. was observed in the case of the composition containing the polymer at the 2.5% concentration. Good gel forming properties were observed at the 5% and 10% concentrations. The gels were heated (at a rate of 1° C./min.) from room temperature to their respective melting points, i.e., 40° C. and 48° C., respectively.

The 2.5% composition was observed to exhibit negative thixotropy at 25° C. This behavior was evaluated by oft-repeated steps of stirring the composition with a stirring rod (to observe viscosity increase or thickening) and cessation of stirring (to observe viscosity reduction).

EXAMPLE 3

A homopolymer of trimethylamine 4-vinylbenzimide was prepared at a 10% solids level using the polymerization method described in EXAMPLE 1, except that azo-isobutyronitrile was employed as a polymerization catalyst. The polymer was precipitated into acetone and recovered. The polymer was added to water at levels of 5% and 10% by weight. Each of the resulting gels was heated to its melting point, 35° C. and 48° C., respectively.

EXAMPLE 4

A coating composition comprised of water and 4% by weight of the coating composition of poly (trimethylamine-4-vinyl-benzimide) was coated onto a transparent polystyrene carrier sheet, at a coverage of about 510 mgs./ft.$^2$ (5490 mgs./m.$^2$). The sheet was hot-air dried and cut into sections. Sections were imbibed in the following imbibition media: water; 0.01N hydrochloric acid; 5% acetic acid solution; 0.15M sodium hydroxide; and 0.10N potassium hydroxide. Sections imbibed in the hydrochloric acid and acetic acid media showed dissolution of the polymer coating. Microscopic examination of the sections imbibed in water, sodium hydroxide and potassium hydroxide showed a gel structure in the coated polymer layer.

What is claimed is:

1. An aqueous polymeric composition exhibiting thermoreversible gel forming properties comprising an aqueous medium having therein, at a weight concentration of from 4% to 10%, a polymeric vinyl aromatic aminimide comprising repeating units of the formula

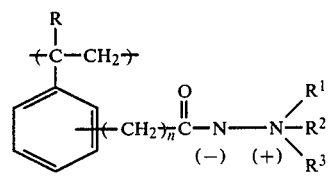

wherein R is hydrogen, methyl or halogen; n is zero or one; and each of $R^1$, $R^2$ and $R^3$ is alkyl, aryl, aralkyl or alkaryl, or two of $R^1$, $R^2$ and $R^3$, together with the nitrogen atom to which they are bonded, complete a heterocyclic ring.

2. The aqueous polymeric composition of claim 1 wherein R is hydrogen, n is zero and each of $R^1$, $R^2$ and $R^3$ is methyl.

3. An aqueous polymeric composition exhibiting negative thixotropic properties comprising an aqueous medium having therein, at a concentration in the range of about 1% to about 3% by weight, a polymeric vinyl aromatic aminimide comprising repeating units of the formula

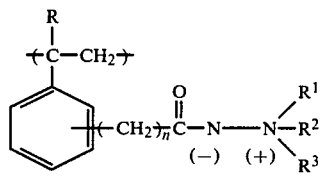

wherein R is hydrogen, methyl or halogen; n is zero or one; and each of $R^1$, $R^2$ and $R^3$ is alkyl, aryl, aralkyl or alkaryl, or two of $R^1$, $R^2$ and $R^3$, together with the nitrogen atom to which they are bonded, complete a heterocyclic ring.

4. An article comprising a support sheet carrying a layer of thermoreversible gel, the gel comprising a medium of water and having therein, at a concentration in the range of from 4% to 10%, a polymeric vinyl aromatic aminimide comprising repeating units of the formula

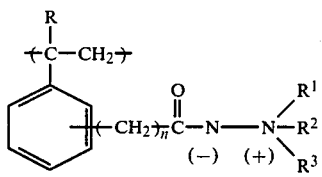

wherein R is hydrogen, methyl or halogen; n is zero or one; and each of $R^1$, $R^2$ and $R^3$ is alkyl, aryl, aralkyl or alkaryl, or two of $R^1$, $R^2$ and $R^3$, together with the nitrogen atom to which they are bonded, complete a heterocyclic ring.

5. The article of claim 4 wherein R is hydrogen, n is zero and each of $R^1$, $R^2$ and $R^3$ is methyl.

6. The article of claim 4 wherein said support sheet is a transparent polymeric support sheet.

7. The article of claim 5 wherein said concentration is in the range of 5% to 10%.

8. An article comprising a polymeric support sheet carrying a polymeric gel layer, the gel layer comprising a medium of water and having therein, at a concentration in the range of from 4% to about 10%, a polymeric vinyl aromatic aminimide comprising repeating units of the formula

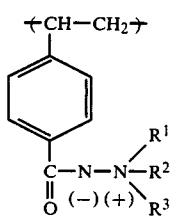

wherein each of $R^1$, $R^2$ and $R^3$ is alkyl.

9. The article of claim 8 wherein each of $R^1$, $R^2$ and $R^3$ is methyl.

10. The article of claim 9 wherein said concentration is in the range of 5% to 10%.

11. The aqueous polymeric composition of claim 3 wherein the polymeric vinyl aromatic aminimide is present in the composition at a concentration of about 2.5%.

* * * * *